US012502915B2

(12) United States Patent
Lin (10) Patent No.: US 12,502,915 B2
(45) Date of Patent: Dec. 23, 2025

(54) MODE-SWAPPABLE TIRE PRESSURE DETECTION SYSTEM AND METHOD OF OPERATING THE SAME

(71) Applicant: Shih-Yao Lin, Taipei (TW)

(72) Inventor: Shih-Yao Lin, Taipei (TW)

(73) Assignee: SYSGRATION LTD.

( * ) Notice: Subject to any disclaimer, the term of this patent is extended or adjusted under 35 U.S.C. 154(b) by 215 days.

(21) Appl. No.: 18/226,221

(22) Filed: Jul. 25, 2023

(65) Prior Publication Data
US 2024/0051353 A1 Feb. 15, 2024

(30) Foreign Application Priority Data
Aug. 12, 2022 (TW) .................. 111130360

(51) Int. Cl.
*B60C 23/04* (2006.01)
(52) U.S. Cl.
CPC ...... *B60C 23/0474* (2013.01); *B60C 23/0479* (2013.01)
(58) Field of Classification Search
None
See application file for complete search history.

(56) References Cited

U.S. PATENT DOCUMENTS

| | | | | |
|---|---|---|---|---|
| 9,296,267 | B2* | 3/2016 | McIntyre | B60C 23/0471 |
| 9,387,732 | B1* | 7/2016 | Gunawan | B60C 23/006 |
| 2015/0015388 | A1* | 1/2015 | McIntyre | B60C 23/0471 340/447 |
| 2017/0225526 | A1* | 8/2017 | Tomakidi | G07C 9/00309 |
| 2019/0255893 | A1* | 8/2019 | Van Wiemeersch | B60C 23/0479 |
| 2019/0337340 | A1* | 11/2019 | Wu | B60C 23/0472 |
| 2020/0258326 | A1* | 8/2020 | Luo | B60C 23/0481 |
| 2022/0324273 | A1* | 10/2022 | Wu | B60C 23/0454 |
| 2022/0402313 | A1* | 12/2022 | Zhang | B60C 23/0415 |

\* cited by examiner

*Primary Examiner* — Peter D Nolan
*Assistant Examiner* — Jacob Kent Besteman-Street (57) ABSTRACT

A mode-swappable tire pressure detection system and a method of operating the same are provided and applied to tires of motor vehicles. The mode-swappable tire pressure detection system has a tire pressure detector. The tire pressure detector has a memory module. The memory module is configured with sensing modes, rendering the tire pressure detector capable of switching between different sensing modes. When a user issues a control instruction to a host or the tire pressure detector, the tire pressure detector can switch between different sensing modes through the memory module.

9 Claims, 8 Drawing Sheets

MODE-SWAPPABLE TIRE PRESSURE DETECTION SYSTEM AND METHOD OF OPERATING THE SAME

FIELD

The present disclosure relates to tire pressure detection systems, and more particularly to a mode-swappable tire pressure detection system and a method of operating the same.

BACKGROUND

Owing to the demand for driving and the advance of technology, systems for detecting tire pressure wirelessly are improving and evolving. The tire pressure detection systems come with tire pressure detectors for detecting the information related to tires in real time, and enable hosts to wirelessly and continuously receive the tire-related information and analyze it to timely inform drivers of the state of the tires, so as to enhance the drivers' road safety in each instance of driving.

SUMMARY

It is an objective of the disclosure to provide a mode-swappable tire pressure detection system and a method of operating the same. The mode-swappable tire pressure detection system comprises a tire pressure detector. The tire pressure detector comprises a memory module. The memory module is configured with a plurality of sensing modes, rendering the tire pressure detector capable of switching between different sensing modes. When a user issues a control instruction to a host or the tire pressure detector, the tire pressure detector can switch between different sensing modes through the memory module. Compared with commercially-available tire pressure detection systems, the mode-swappable tire pressure detection system of the disclosure comes with a mode-swappable feature to thereby exhibit high applicability and durability.

DETAILED DESCRIPTION

Referring to FIG. 1 through FIG. 8, the disclosure provides a mode-swappable tire pressure detection system, comprising a host 1 and a tire pressure detector 2. The host 1 is wirelessly connected to the tire pressure detector 2 and comprises a first information transceiving module 11 and a control module 12. The first information transceiving module 11 and the control module 12 are electrically connected.

Figure 1:
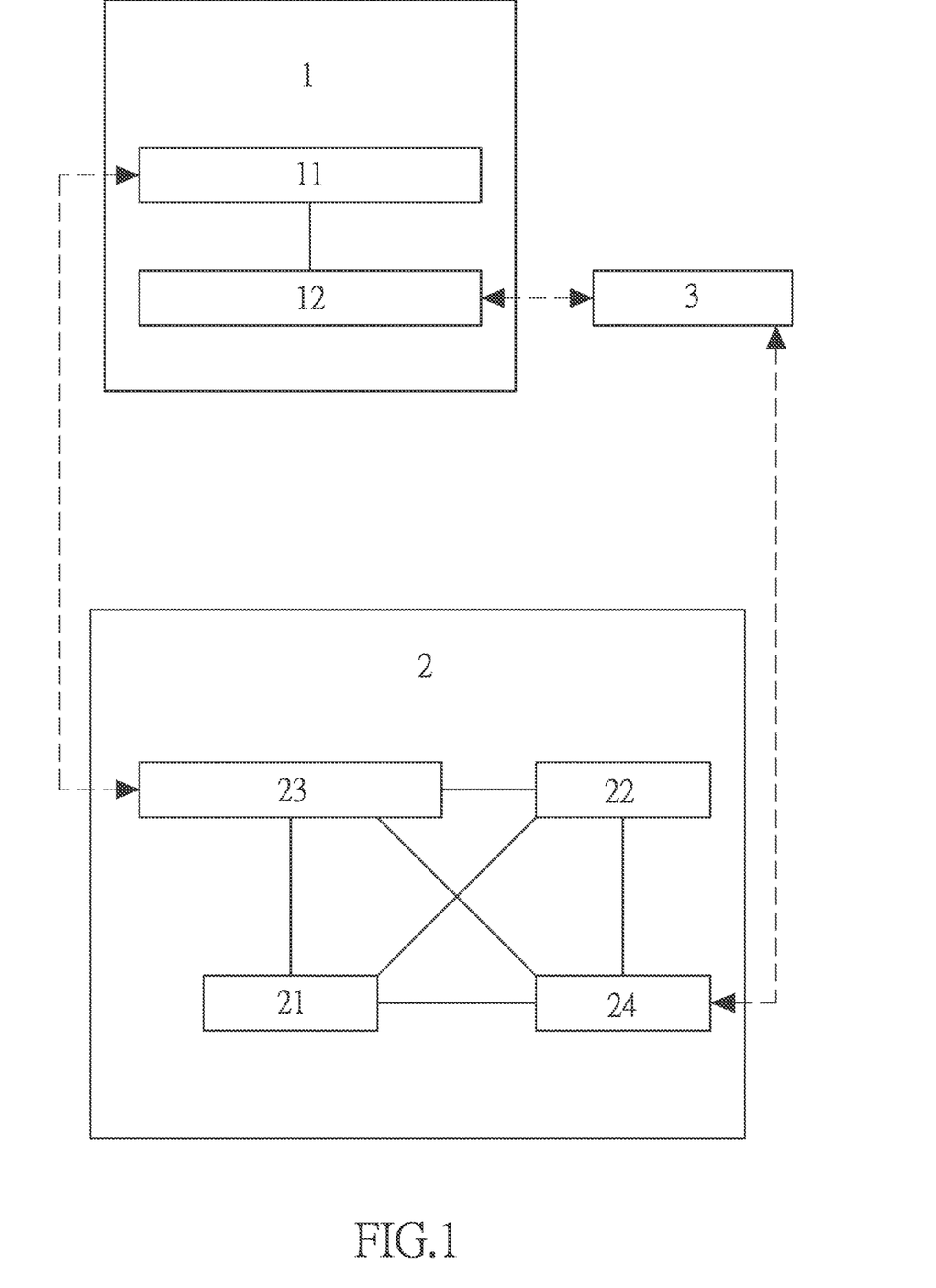
FIG. 1 is a block diagram of a system of the disclosure.

The tire pressure detector 2 comprises a sensing module 21, a memory module 22, a second information transceiving module 23 and a master module 24 which are electrically connected to each other. The sensing module 21 is adapted to sense a tire information. The memory module 22 is configured with a plurality of sensing modes. The master module 24 controls the memory module 22 to switch between different sensing modes. The second information transceiving module 23 and the first information transceiving module 11 are wirelessly connected and transmit the tire information to each other.

Referring to FIG. 1 through FIG. 8, the disclosure further provides an external control component 3. The external control component 3 is electrically connected to the control module 12 and the master module 24. The external control component 3 is at least one of a host control panel, a wireless control tool, a software app, a wireless OTA (over-the-air programming) device, and a wireless remote control system. The external control component 3 is for use in operating the host 1 and displaying data about the state of the tire pressure detector 2.

Regarding the host control panel, a user uses the host control panel to control the host 1 in a motor vehicle to issue an instruction to the tire pressure detector 2.

Figure 4:
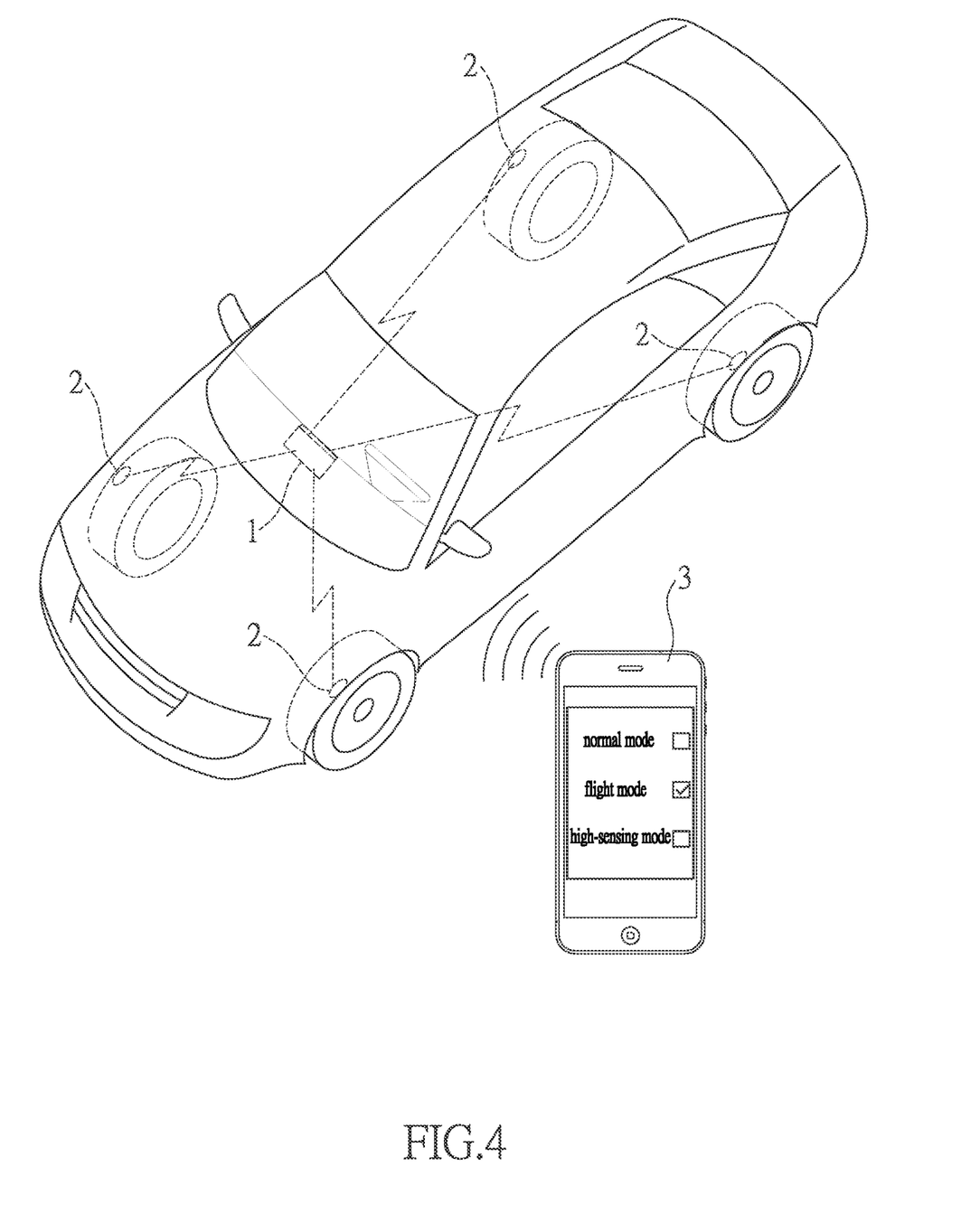
FIG. 4 is a schematic view of the usage of the first method of the disclosure.
Figure 8:
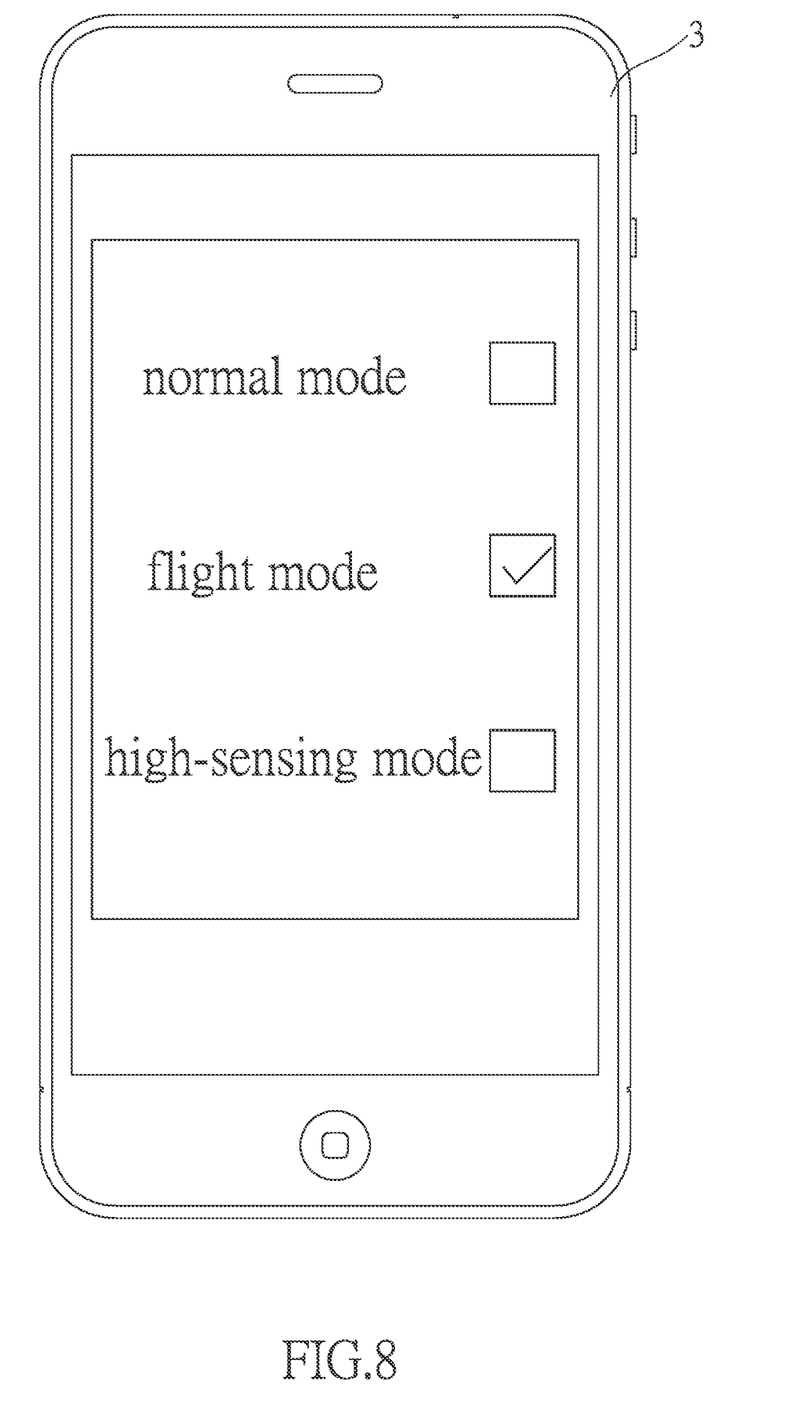
FIG. 8 is a schematic view of the display of an external control component of the disclosure.

Referring to FIG. 4 and FIG. 8, the sensing modes of the disclosure include a normal mode, a flight mode and a high-sensing mode, allowing the sensing module 21 of the tire pressure detector 2 to not operate in the flight mode but to sense and return the tire information in the high-sensing mode at a frequency higher than in the normal mode. Therefore, the tire pressure detection system of the disclosure exhibits high applicability and switches between different sensing modes as needed.

The flight mode is the mode in which the sensing module 21 does not operate so that security check instruments remain unaffected by the tire pressure detector 2 while the motor vehicles transported by airplane are undergoing security checks and taking a flight, so as to lower risks.

The sensing modes of the memory module 22 are each configured to be valid continuously for a specific time period and to be swapped for another one of the sensing modes at the end of the specific time period, so as to enable fixed-interval switching and thereby ensure that the mode-swappable tire pressure detection system of the disclosure functions well even though the user forgets to switch between the sensing modes after having switched between the sensing modes.

Referring to FIG. 1 through FIG. 4, the disclosure provides the first method to the system. The first method comprises a controlling step S11, a transmitting step S12, a switching step S13 and a returning step S14. In the controlling step S11, the external control component 3 inputs a control instruction to the host 1.

Figure 2:
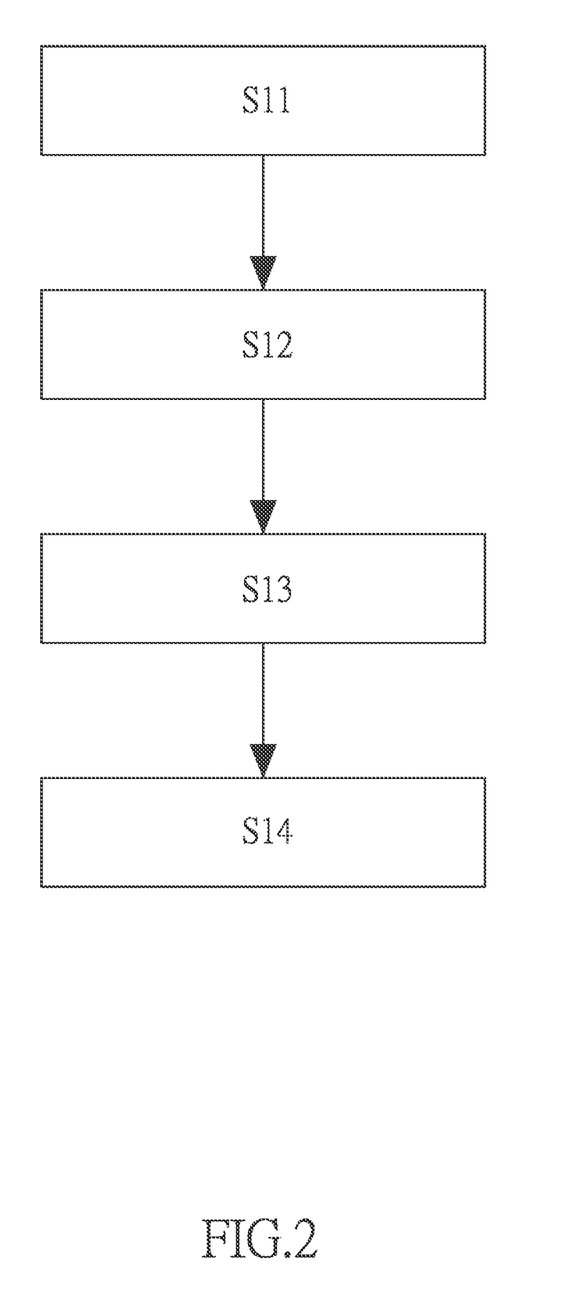
FIG. 2 is a schematic view of the process flow of the first method of the disclosure.
Figure 3:
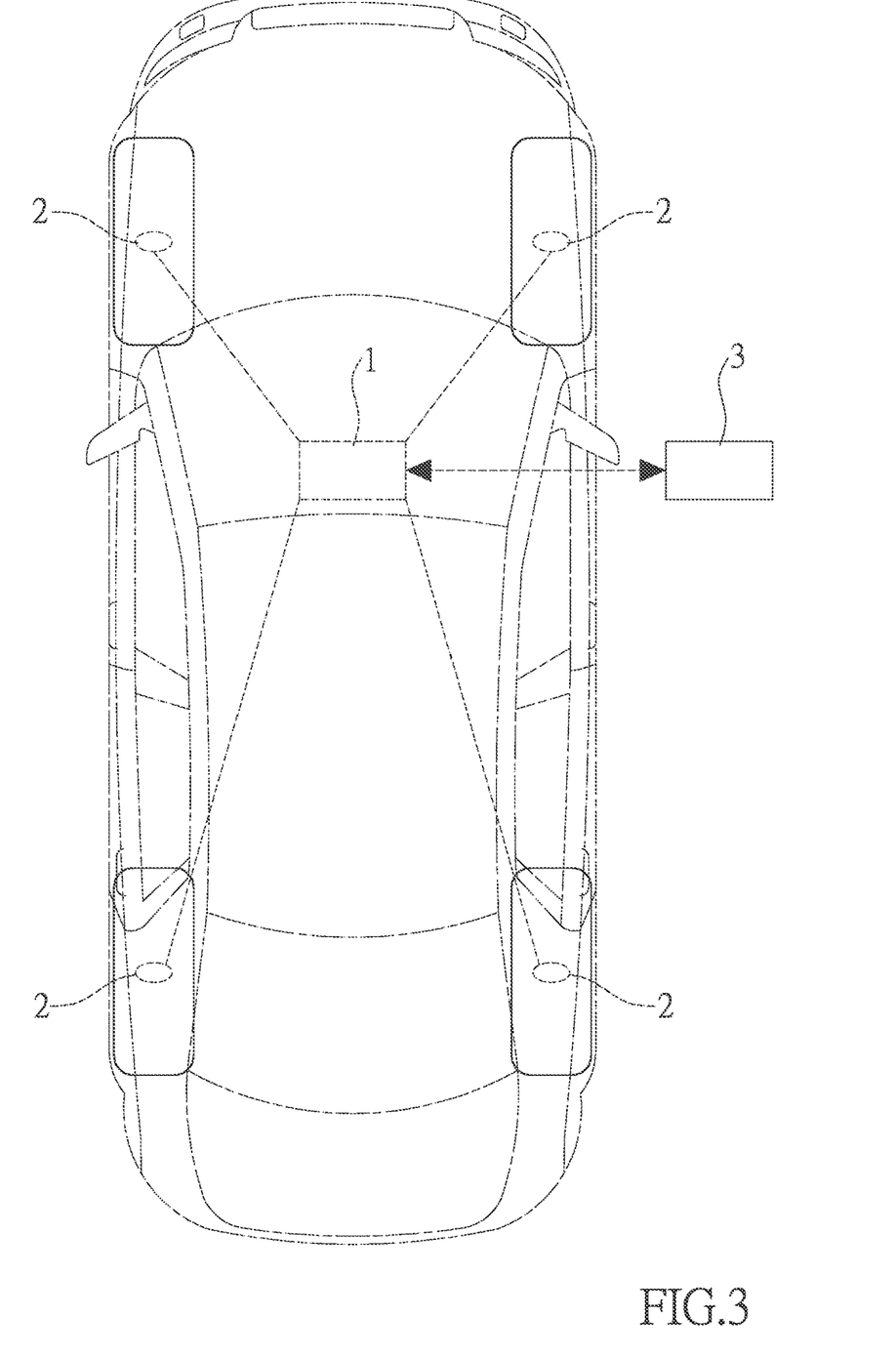
FIG. 3 is a schematic view of the actual usage of the first method of the disclosure.

The transmitting step S12 follows the controlling step S11 and requires the host 1 to receive and transmit the control instruction to the tire pressure detector 2 by wireless transmission.

Then, the switching step S13 follows the transmitting step S12 and requires the tire pressure detector 2 to receive the control instruction and control the memory module 22 to switch between the sensing modes.

Finally, the returning step S14 follows the switching step S13 and requires the tire pressure detector 2 to switch between the sensing modes and inform the host 1 of the switch success.

Referring to FIG. 1 through FIG. 4, in practice, the user only needs to use the external control component 3 to input the control instruction to the host 1, and then the host 1 transmits the control instruction to the tire pressure detector 2. After that, the memory module 22 of the tire pressure detector 2 enables the tire pressure detector 2 to switch between different sensing modes. Next, the tire pressure detector 2 informs the host 1 and the external control component 3 of the switch success, informing the user of the success of switching between different sensing modes.

Referring to FIG. 4 and FIG. 8, the sensing modes of the method include a normal mode, a flight mode and a high-sensing mode, allowing the sensing module 21 of the tire pressure detector 2 to not operate in the flight mode but to sense and return the tire information in the high-sensing mode at a frequency higher than in the normal mode. Therefore, the tire pressure detection system of the disclosure exhibits high applicability and switches between different sensing modes as needed.

The sensing modes of the memory module 22 are each configured to be valid continuously for a specific time period and to be swapped for another one of the sensing modes at the end of the specific time period, so as to enable fixed-interval switching and thereby ensure that the mode-swappable tire pressure detection system of the disclosure functions well even though the user forgets to switch between the sensing modes after having switched between the sensing modes.

In the controlling step S11 of the method, the external control component 3 transmits the control instruction to the host 1 to enable the user to easily operate the tire pressure detector 2 to switch between the sensing modes.

Regarding the host control panel, the user uses the host control panel to control the host 1 in a motor vehicle to issue an instruction to the tire pressure detector 2.

Figure 5:
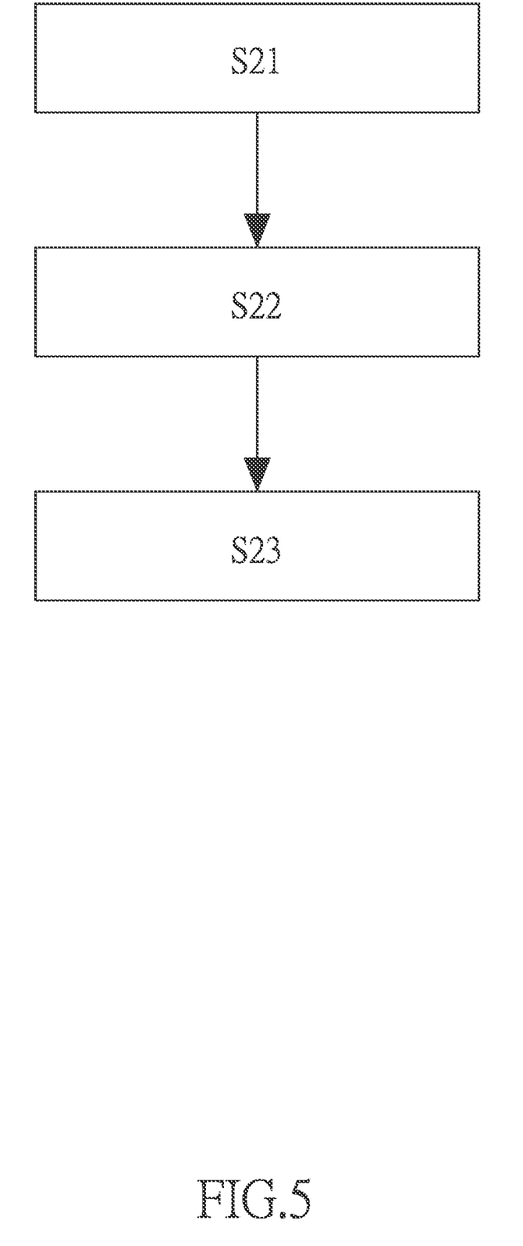
FIG. 5 is a schematic view of the process flow of the second method of the disclosure.

To achieve its objective and advantages, the disclosure further provides the second method comprising a controlling step S21, a switching step S22 and a confirming step S23. The controlling step S21 requires the external control component 3 to transmit the control instruction to the tire pressure detector 2.

The switching step S22 follows the controlling step S21 and requires the tire pressure detector 2 to receive the control instruction and control the memory module 22 to switch between the sensing modes.

Finally, the confirming step S23 follows the switching step S22 and requires the tire pressure detector 2 to switch between the sensing modes and inform the host 1 and the external control component 3 of the switch success.

Figure 6:
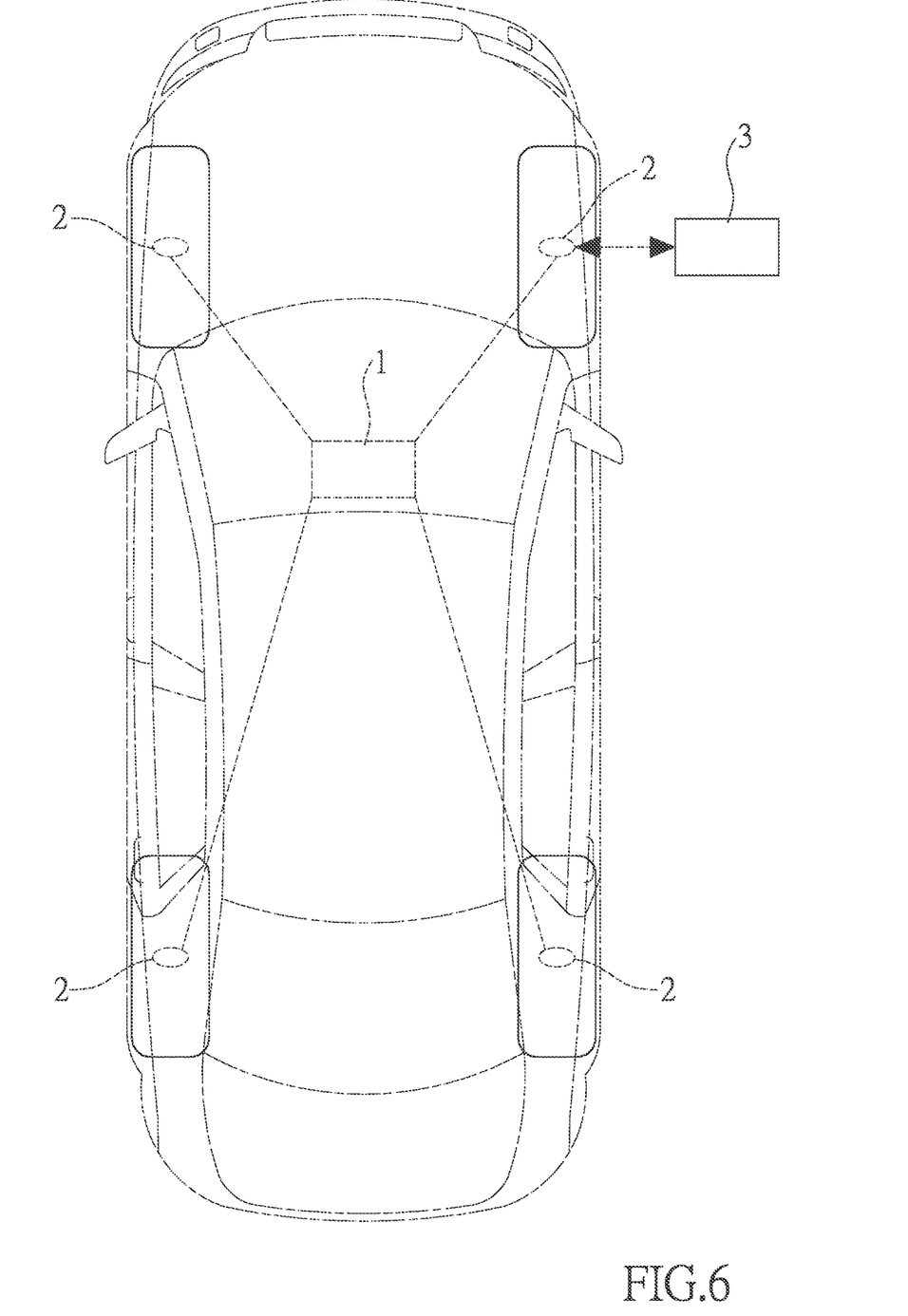
FIG. 6 is a schematic view of the actual usage of the second method of the disclosure.
Figure 7:
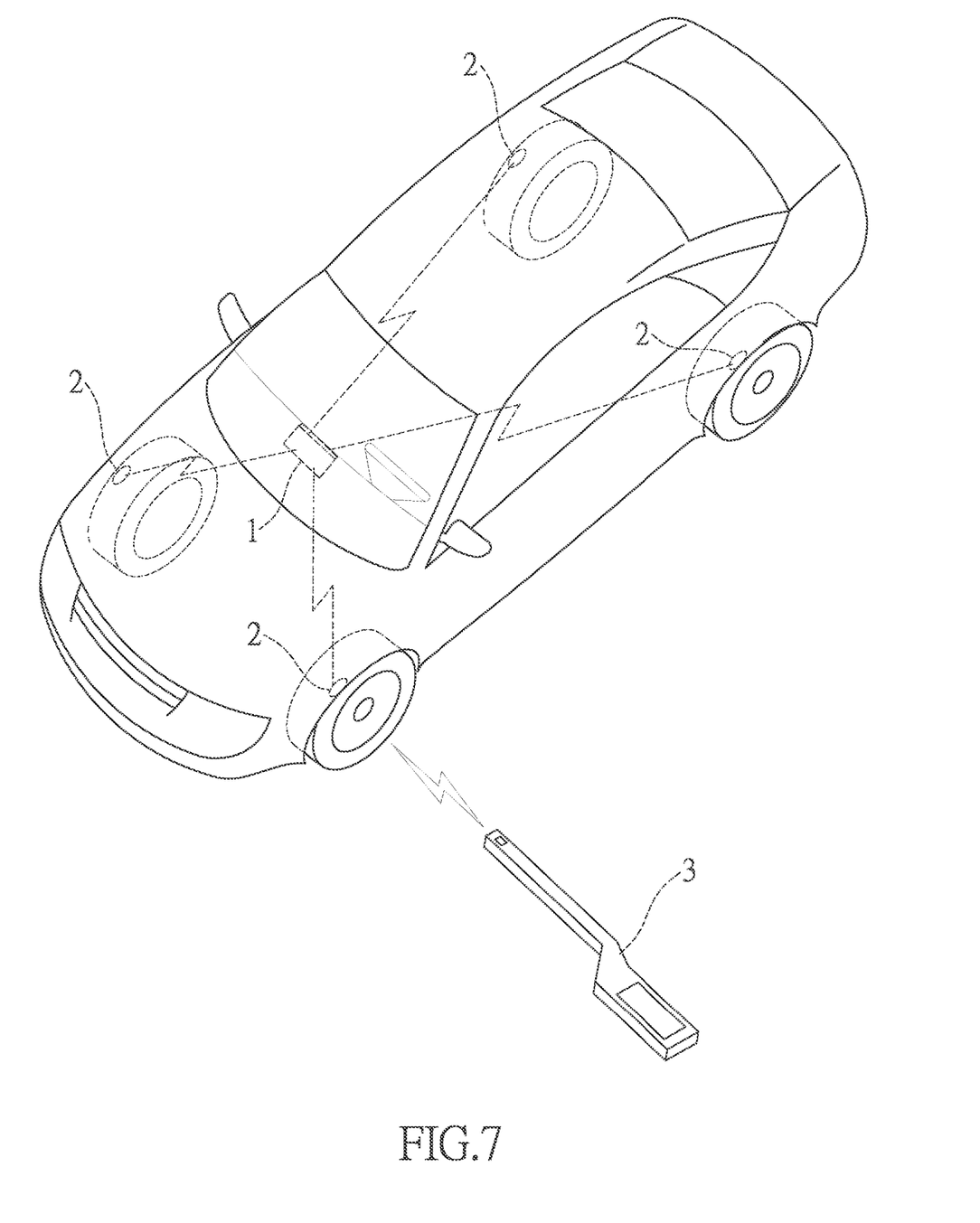
FIG. 7 is a schematic view of the usage of the second method of the disclosure.

In practice, the user only needs to input the control instruction to the tire pressure detector 2 with the external control component 3 so that the tire pressure detector 2 controls the memory module 22 therein to switch between different sensing modes. Then, the tire pressure detector 2 informs the host 1 and the external control component 3 of the switch success, informing the user of the success of switching between different sensing modes.

Referring to FIG. 8, the sensing modes of the method include a normal mode, a flight mode and a high-sensing mode, allowing the sensing module 21 of the tire pressure detector 2 to not operate in the flight mode but to sense and return the tire information in the high-sensing mode at a frequency higher than in the normal mode. Therefore, the tire pressure detection system of the disclosure exhibits high applicability and switches between different sensing modes as needed.

The sensing modes of the memory module 22 are each configured to be valid continuously for a specific time period and to be swapped for another one of the sensing modes at the end of the specific time period, so as to enable fixed-interval switching and thereby ensure that the mode-swappable tire pressure detection system of the disclosure functions well even though the user forgets to switch between the sensing modes after having switched between the sensing modes.

In the controlling step S21 of the method, the external control component 3 transmits the control instruction to the tire pressure detector 2 to enable the user to easily operate the tire pressure detector 2 to switch between the sensing modes. The external control component 3 connects to only one single tire pressure detector, but the disclosure is not limited thereto. The external control component 3 is capable of attaining wireless connection and controlling all the tire pressure detectors 2.

What is claimed is:

1. A mode-swappable tire pressure detection system, comprising:
    a host connected wirelessly to a tire pressure detector and comprising a first information transceiving module and a control module, wherein the first information transceiving module and the control module are electrically connected;
    the tire pressure detector comprising a sensing module, a memory module, a second information transceiving module and a master module electrically connected to each other, the sensing module being adapted to sense a tire information, the memory module being configured with a plurality of sensing modes, and the master module being adapted to control the memory module to switch between different sensing modes, wherein the second information transceiving module and the first information transceiving module are connected wirelessly to transmit the tire information to each other, and
    an external control component wirelessly connected to the control module and the master module.

2. The mode-swappable tire pressure detection system of claim 1, wherein the external control component is at least one of a host control panel, a wireless control tool, a software app, a wireless OTA (over-the-air programming) device, and a wireless remote control system.

3. The mode-swappable tire pressure detection system of claim 1, wherein the sensing modes include a normal mode, a flight mode and a high-sensing mode, allowing the sensing module to not operate in the flight mode but to sense and return the tire information in the high-sensing mode at a frequency higher than in the normal mode.

4. The mode-swappable tire pressure detection system of claim 3, wherein the sensing modes are each configured to be valid continuously for a specific time period and to be swapped for another one of the sensing modes at the end of the specific time period.

5. A method of operating a mode-swappable tire pressure detection system, comprising steps as follows:
    a controlling step requiring the external control component to input a control instruction to the host;
    a transmitting step requiring the host to receive and transmit the control instruction to the tire pressure detector by wireless transmission;
    a switching step requiring the tire pressure detector to receive the control instruction and control the memory module to switch between the sensing modes; and a returning step requiring the tire pressure detector to switch between the sensing modes and inform the host and the external control component of switch success.

6. The method of claim 5, wherein in the controlling step the control instruction is transmitted to the host with at least one of a host control panel, a wireless control tool, a software app, a wireless OTA (over-the-air programming) device, and a wireless remote control system.

7. The method of claim 5, wherein the sensing modes include a normal mode, a flight mode and a high-sensing mode to allow the sensing module to not operate in the flight mode but to sense and return the tire information in the high-sensing mode at a frequency higher than in the normal mode, and the sensing modes are each configured to be valid continuously for a specific time period and to be swapped for another one of the sensing modes at the end of the specific time period.

8. A method of operating a mode-swappable tire pressure detection system, comprising steps as follows:

a controlling step requiring the external control component to transmit the control instruction to the tire pressure detector;

a switching step requiring the tire pressure detector to receive the control instruction and control the memory module to switch between the sensing modes; and a confirming step requiring the tire pressure detector to switch between the sensing modes and inform the host and the external control component of switch success.

9. The method of claim 8, wherein in the controlling step the control instruction is transmitted to the tire pressure detector with at least one of a wireless control tool, a software app, a wireless OTA (over-the-air programming) device, and a wireless remote control system, and the sensing modes include a normal mode, a flight mode and a high-sensing mode, allowing the sensing module to not operate in the flight mode but to sense and return the tire information in the high-sensing mode at a frequency higher than in the normal mode, and the sensing modes are each configured to be valid continuously for a specific time period and to be swapped for another one of the sensing modes at the end of the specific time period.

* * * * *